No. 834,509. PATENTED OCT. 30, 1906.
C. COZIER.
VETERINARY OPERATING TABLE.
APPLICATION FILED DEC. 27, 1905.

WITNESSES:
R. S. Simpson
John L. Thomas

INVENTOR
Carl Cozier
BY
David E. Law
ATTORNEY

THE NORRIS PETERS CO., WASHINGTON, D. C.

UNITED STATES PATENT OFFICE.

CARL COZIER, OF BELLINGHAM, WASHINGTON.

VETERINARY OPERATING-TABLE.

No. 834,509.  Specification of Letters Patent.  Patented Oct. 30, 1906.

Application filed December 27, 1905. Serial No. 293,543.

*To all whom it may concern:*

Be it known that I, CARL COZIER, a citizen of the United States, and a resident of Bellingham, in the county of Whatcom and State of Washington, have invented certain new and useful Improvements in Veterinary Operating-Tables, of which the following is a specification.

My invention relates to an improvement in veterinary operating-tables; and it consists of an improved gear by means of which the table-top can be easily revolved through an angle of ninety degrees and automatically retained in any stage of the revolution.

Figure 1:
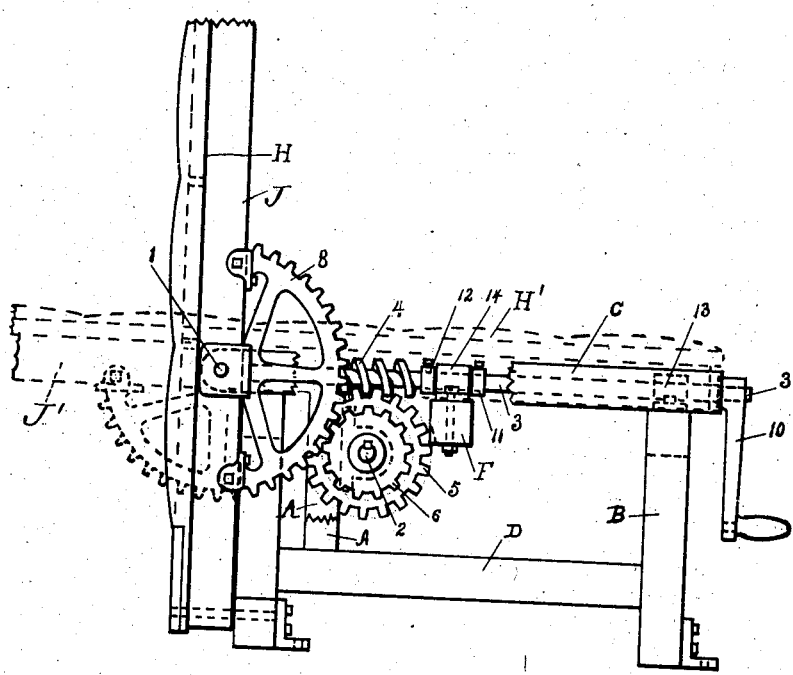
Figure 2:
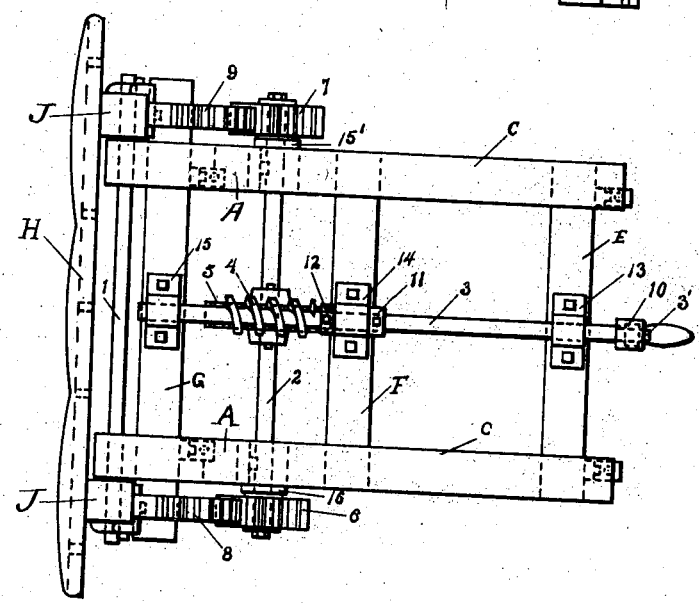

Referring to the one sheet of drawings forming a part of this application, Figure 1 is a side elevation of a veterinary operating-table fitted with my device, and Fig. 2 is a plan view of the same.

Similar characters refer to similar parts in the two views. A, B, C, D, E, F, and G are the several members of the table-stand, portions of which are removed in Fig. 1, and H is the table-top, rigidly attached to beams J J'. 1 is a horizontal shaft passing through the left-hand ends of the upper rails C C of the table-stand. This shaft also passes through two beams, to which the planks forming the table-top are fastened. The table-top is so hung on the shaft 1 that it may revolve from an upright position, as shown in Figs. 1 and 2, to a horizontal position, as indicated in dotted outline H' in Fig. 1, when it lies on top of the table-stand. Segmental gears 8 and 9 are rigidly attached to the beams of the top referred to concentric with shaft 1. Horizontal shaft 2 is parallel with shaft 1 and is supported in boxes 15' 16, fastened to members A A of the table-stand. Shaft 2 has keyed to each end spur-gears 6 and 7. Shaft 2 occupies such a position that spur-gears 6 and 7 may mesh with segmental gears 8 and 9, respectively. Shaft 2 has keyed to it at a point midway between the spur-gears worm-wheel 5. At right angles to shafts 1 and 2 is horizontal shaft 3, retained in boxes 13, 14, and 15 on members E, F, and G, respectively. Rigidly attached to shaft 3 is worm 4, so situated as to engage with worm-wheel 5. Set-rings 11 and 12 on shaft 3 prevent end movement of this shaft. The right-hand end 3' projects beyond the table-stand and is squared to receive the removable crank 10.

Now by turning crank 10 power is transmitted through the worm and worm-wheel to the spur-gears and thence to the segmental gears, and the top H is revolved through the angle of ninety degrees as desired. Furthermore, because of the worm 4 and worm-wheel 5 in this train of gears the table-top cannot be forced into any other position except by turning the crank 10. Hence the presence of the worm and worm-wheel in the train of gears causes the table-top to be automatically locked in any desired part of the arc through which it may revolve about shaft 1. With this device are hopples, straps, and ropes for securely fastening an animal to the table-top; but as I do not claim them as a part of this invention they are not illustrated in the drawings.

In using the device the table-top is brought to the vertical position shown in Figs. 1 and 2 by revolving the crank 10. Then the animal—a horse, for instance—is caused to stand by the side of the table-top, when he is securely fastened to the same by means of the fastening devices referred to. Then by turning the crank 10 the table-top H with the horse fastened to the same is brought from the vertical position to a horizontal position on top of the table-stand or left at any angle of inclination desired between these two positions. Because of the worm and worm-wheel it will be securely locked in any of these positions until the crank is again turned. Thus one person unaided can safely operate this device.

Having thus described my invention, what I claim as new, and desire to secure by Letters Patent, is—

The combination, with a suitable, supporting-frame, of a veterinary operating-table hinged to a horizontal rod, which is retained in suitable bearings rigidly attached to said supporting-frame; a segment of a gear rigidly attached to said table and concentric with said rod; a horizontal shaft parallel to said rod and supported in suitable bearings which are rigidly attached to said supporting-frame; a spur-gear rigidly attached to said shaft and meshing in said segment of a gear; a worm-wheel rigidly attached to said horizontal shaft; a driving-shaft, at right angles with said horizontal shaft, which is supported in bearings rigidly attached to said supporting-frame, and to one end of which is rigidly attached a worm enmeshed in said worm-wheel, while to the other end is fitted a removable crank.

Signed at Bellingham, in the county of Whatcom and State of Washington, this 20th day of December, A. D. 1905.

CARL COZIER.

Witnesses:
R. S. SIMPSON,
DAVID E. LAIN.